Sept. 10, 1929.   G. M. DOULL   1727,816
SCALING AND DRILLING TOOL
Filed Oct. 6, 1926   3 Sheets-Sheet 3

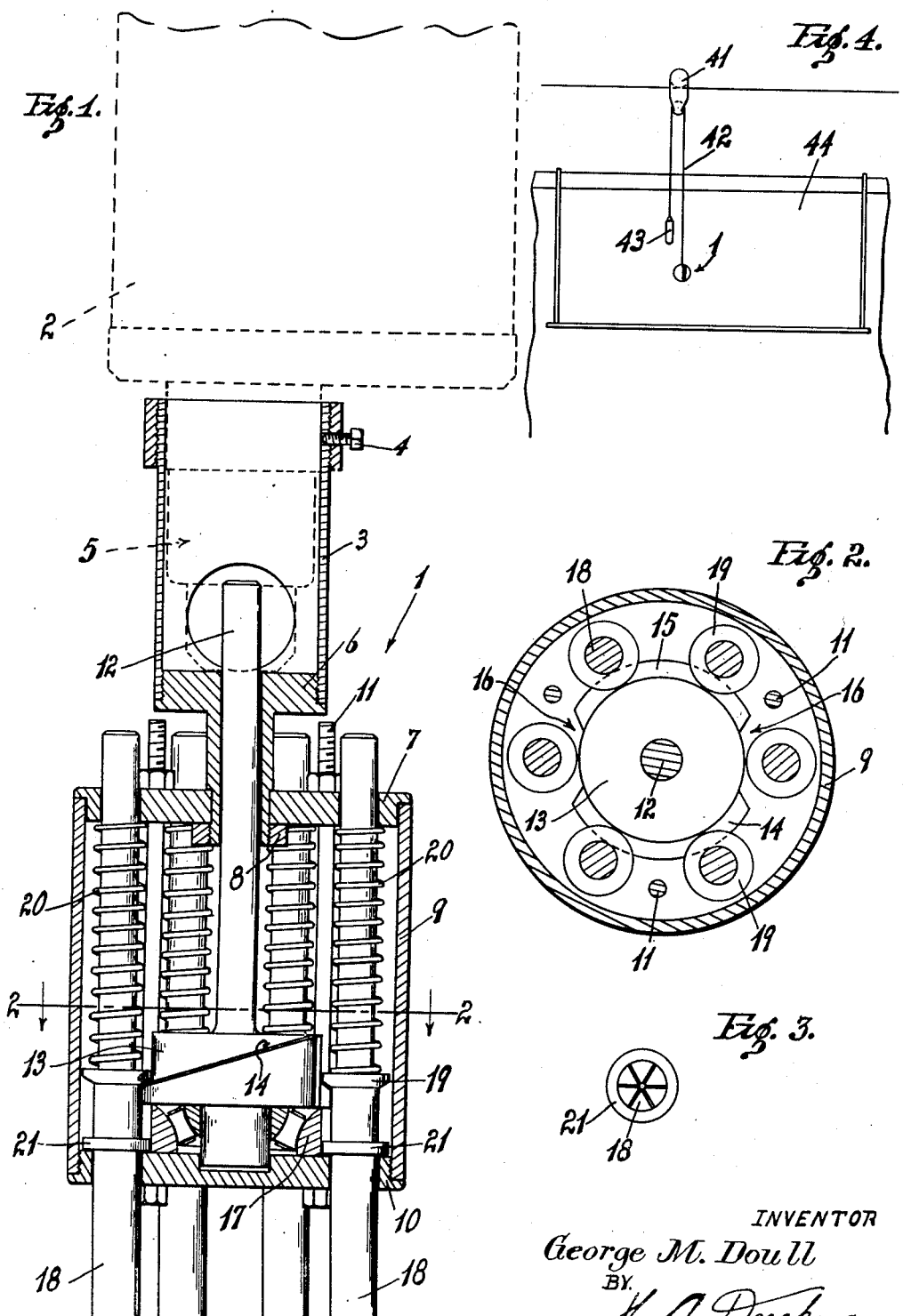

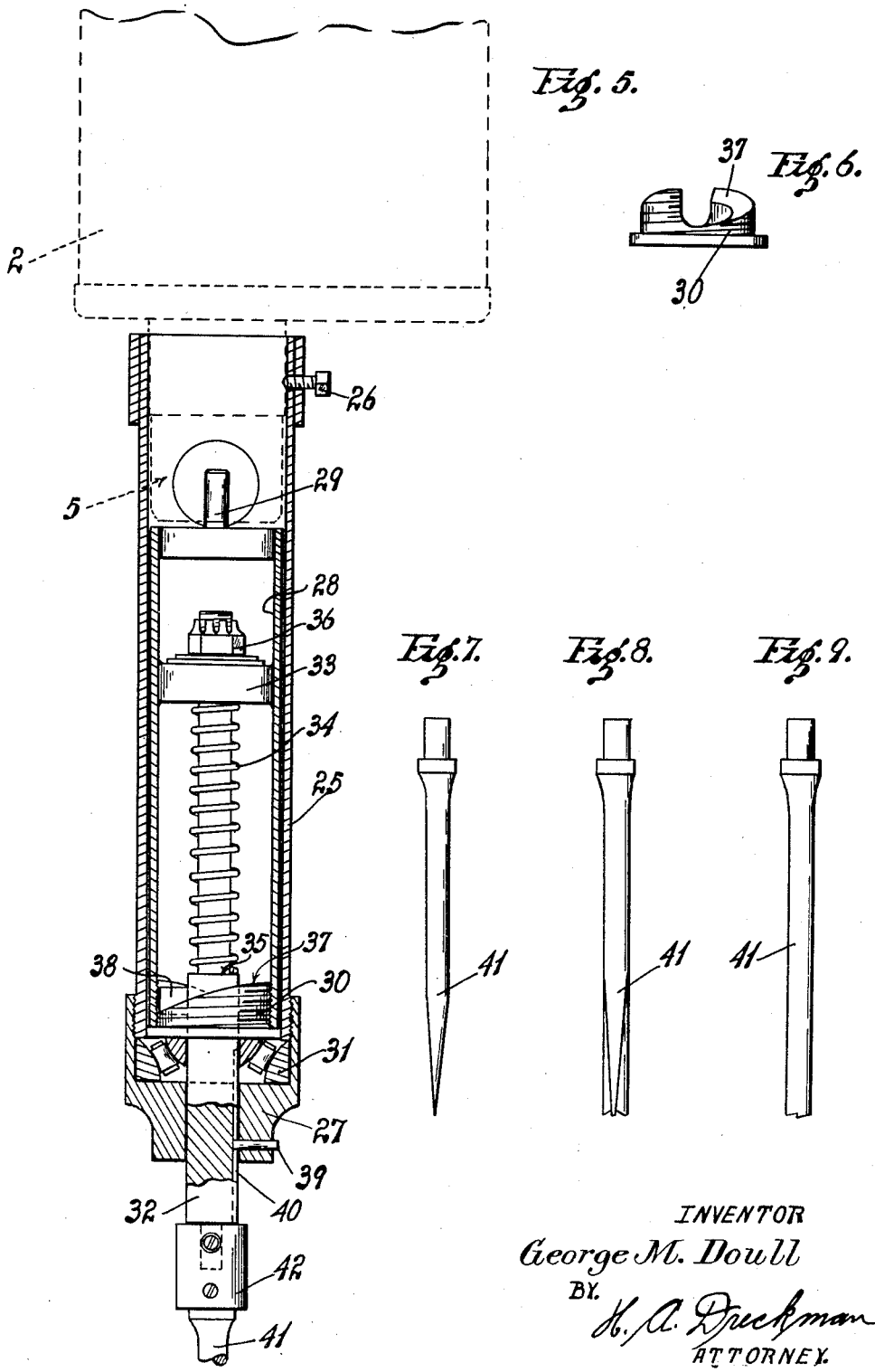

INVENTOR
George M. Doull
BY
ATTORNEY.

Patented Sept. 10, 1929.

1,727,816

UNITED STATES PATENT OFFICE.

GEORGE M. DOULL, OF LONG BEACH, CALIFORNIA.

SCALING AND DRILLING TOOL.

Application filed October 6, 1926. Serial No. 139,860.

In removing the scale from metal structure, such as ships, it has been the practice heretofore to use a single bitted pneumatic or hand tool;—which practice was very slow and laborious or required expensive appliances, and in the case of a ship, drydocking was necessary, to make the pneumatic tool, available.

An object of my invention is to provide a novel multiple bitted electrically operated scaling tool.

Another object is to provide a portable and easily operated tool.

An advantage of my tool resides in the rapidity with which large surfaces can be covered in a short space of time.

A further object is to provide a scaling tool which is simple in construction and effective in operation.

A still further object is to provide a novel electrically operated tool which may be used for various purposes such as scaling, drilling and the like, by merely interchanging the bits.

Still another object is to provide a tool for scaling, drilling and the like, which is attachable to a well known type of portable motor.

Other objects, advantages, and features of invention may appear from the accompanying drawing, the subjoined detailed description and the appended claims.

In the drawings—

Fig. 1 is a longitudinal sectional view of my scaling tool.

Fig. 2, is a sectional view taken on line 2—2, Fig. 1.

Fig. 3, is a bottom plan view of a bit.

Fig. 4, is a diagrammatic view of a means of operating the tool.

Fig. 5, is a longitudinal sectional view of a modified form of tool.

Fig. 6, is a side elevation of the cam member.

Fig. 7, is a side elevation of a bit.

Fig. 8, is a side elevation of another type of bit.

Fig. 9, is a side elevation of still another type of bit.

Figure 10:
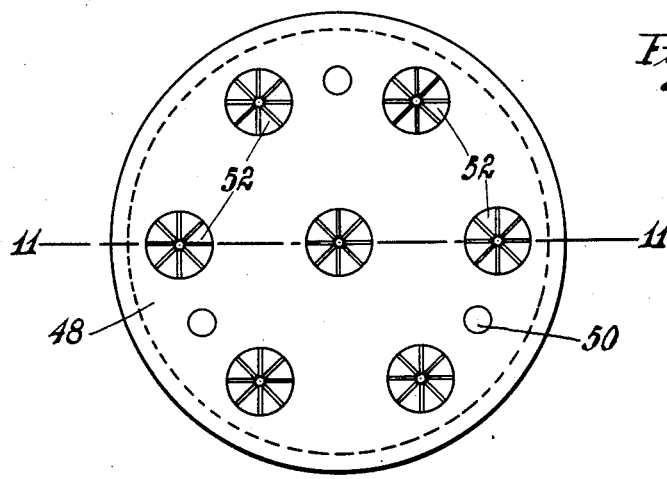
Fig. 10 is a bottom plan view of a scaling tool attachment for a pneumatic hammer.

Referring more particularly to the drawing; the tool 1, is adapted to be mounted on and driven from a motor 2, of usual and well known construction. A tube 3 is secured to a stationary part of the motor 2 by a set screw 4 and said tube encloses the driven chuck 5 of the motor. A head 6 is secured to the lower end of the tube 3 and a top plate 7 is secured to the bottom of said head, by the nut 8.

The sleeve 9 shoulders on the plate 7, and a bottom plate 10 is secured to the lower end of said sleeve. The plates 7, 10 and sleeves 9 are held together by a plurality of bolts 11 extending through said plates.

A shaft 12 is secured in the chuck 5 and is journaled in the head 6. This shaft extends into the sleeve 9 and a cam head 13 is formed on the lower end thereof, said head being formed with two inclined cam surfaces 14, 15. Two diametrically opposed spaces 16, 16 are provided through the cam surfaces 14, 15, the purpose of which will be further described. The lower end of the shaft 12 below the head 13 is mounted in an anti-friction bearing 17 seated on the lower plate 10.

A plurality of circumferentially spaces bits 18 are reciprocally mounted in the plates 7 and 10, and are positioned adjacent the cam head 13. Each bit is formed with a ring 19 which rings are adapted to be engaged by the cam surfaces 14, 15. A spring 20 surrounds each of the bits 18 and is positioned between the plate 7 and ring 19. As the head 13 is rotated by the motor 2, the cam surfaces 14, 15 engage the rings 19 and lift the bits 18 against the tension of the springs 20. When the rings 19 reach the spaces 16 the springs 20 force the bits 18 downwardly to act against a surface for scaling or drilling purposes. A boss 21 is provided on each of the bits below the rings 19, which engage the plate 10 to limit the downward movement of the bits and also take the thrust of the springs 20 off of the rings and cam head 13.

For scaling purposes the bits 18 are provided with a plurality of cutting edges on the bottom thereof as shown in Fig. 3.

For drilling purposes my tool may take the form shown in Figs. 5 and 9 inclusive and comprises a tube 25 secured by a set screw 26 to a stationary part of the motor 2, and a head 27 is threaded on the lower end of said tube.

A sleeve 28 is positioned within the tube 25 and is rotated by the chuck 5 of the motor 2 which chuck engages a pin 29 rising from the top of said sleeve.

A cam member 30 is secured to the lower end of the sleeve 28 and rests on an anti-friction bearing 31 in the head 27.

A shaft 32 is reciprocally mounted in the tool and is journaled in the head 27 and block 33 in the sleeve 28. A spring 34 surrounding the shaft between the block 33 and a shoulder 35 on said shaft urges the same downwardly to drill into the surface required. The nut 36 on the top of the shaft 32 engages the block 33 to limit the outward movement of said shaft. This shaft is reciprocated by the cam surfaces 37 on the member 30, engaging a pin 38 thereon, said pin dropping off of the cam surfaces at the top thereof, at each half revolution of the cam member, and the spring 34 carries the shaft downwardly. To prevent the shaft 32 from rotating a pin 39 in the head 27 enters a slot 40 in the shaft.

A bit 41 of any desired type such as shown in Figures 7 and 8 and 9, is secured to the shaft 32 by the sleeve 42.

In Fig. 4 I have shown a method of using my tool while the tool 1 is suspended by a rope 42 from a traveling pulley 41. A counterweight 43 holds the tool 1 at any desired position on the surface 44.

Figure 11:
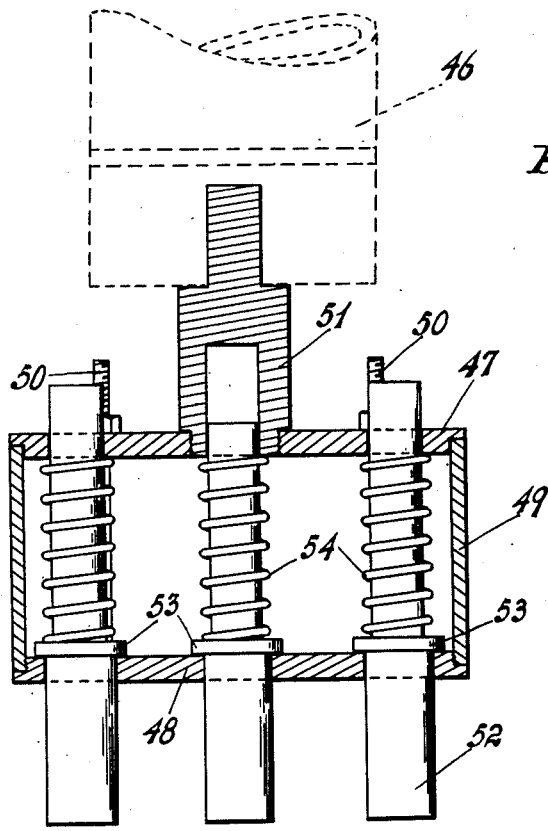
Fig. 11, is a longitudinal sectional view of the same.

In Figs. 10 and 11 I have shown a scaling tool which may be attached to the usual type of pneumatic hammer 46, in common use in shipyards and the like. The tool comprises an upper plate 47 and a lower plate 48, which are joined together by a sleeve 49. Bolts 50 extend through the plates 47, 48 to hold them securely together. A post 51 screws into the plate 47 and the upper end thereof is adapted to be secured in the hammer 46, in the usual manner. A plurality of bits 52, extend between and are journaled in the plates 47, 48. A stop collar 53 is provided on each bit and bears against the plate 48. Springs 54 surround each of the bits and extend between the collar 53 and plate 47; thereby urging the bits downwardly on to the surface worked upon. Due to the resilient mounting of the bits the tool will operate over an irregular surface to scale the same.

Having described my invention I claim:

1. In combination with a motor, a tool comprising a tube fixedly secured to the motor, a head on said tube, a top plate secured to the head, a bottom plate spaced from the top plate, bits reciprocally mounted in said top and bottom plates, a shaft journaled in said head, means securing said shaft to the motor for rotating movement, cam means on the shaft, and means on the bits adapted to be engaged by the cam means whereby said bits are reciprocated.

2. In combination with a motor, a tool comprising a tube fixedly secured to the motor, a head on said tube, a top plate secured to the head, a bottom plate spaced from the top plate, bits reciprocally mounted in said top and bottom plates, a shaft journaled in said head, means securing said shaft to the motor for rotating movement, a cam head on said shaft having cam surfaces thereon, a ring on said bits adapted to be engaged by said cam surfaces to lift said bits, and a spring surrounding each bit and bearing against the ring and the top plate.

3. In combination with a portable electric motor including a driving chuck, a tube fixedly secured to the motor, a head on said tube, a top plate secured to the head, a bottom plate spaced from the top plate, bits reciprocally mounted in said top and bottom plates, a shaft journaled in said head and secured to said chuck, a cam head on the lower head of said shaft and an anti-friction bearing in said lower plate upon which the cam head rests, a ring on each of said bits adjacent the lower end thereof, adapted to be engaged by the cam surfaces to lift said bits, a spring surrounding each bit and bearing against the ring and the top plate, said cam surfaces being spaced so as to permit the rings to drop off the end of the cam under the urge of the spring and each of said bits being provided with a cutting edge on the bottom thereof, for removing the scaling and the like from metal surfaces.

4. In combination with a portable electric motor including a driving chuck, a tube fixedly secured to the motor, a head on said tube, a top plate secured to the head, a bottom plate spaced from the top plate, a shell secured to the lower plate and extending to the upper plate, bolts extending through the upper and lower plates to hold the same together, and bits reciprocally mounted in said top and bottom plates, a shaft journaled in said head and secured to said chuck, a cam head on the lower head of said shaft and an anti-friction bearing in said lower plate upon which the cam head rests, a ring on each of said bits adjacent the lower end thereof, adapted to be engaged by the cam surfaces to lift said bits, a spring surrounding each bit and bearing against the ring and the top plate, said cam surfaces being spaced apart so as to permit the rings to drop off the end of the cam under the urge of the spring and each of said bits being provided with a cutting edge on the bottom thereof for removing the scaling and the like from metal surfaces, and a boss formed on each of the bits below the ring, said bosses being adapted to engage the bottom plate to limit the downward movement of the bits.

In testimony whereof I affix my signature.

GEORGE M. DOULL.